March 13, 1934.  E. J. STRAND  1,951,219
FRUIT JUICE EXTRACTOR
Filed Aug. 21, 1933

INVENTOR.
ERIC J. STRAND
BY
Harry H. Hitzeman
ATTORNEY.

Patented Mar. 13, 1934

1,951,219

UNITED STATES PATENT OFFICE 1,951,219

FRUIT JUICE EXTRACTOR

Eric J. Strand, Chicago, Ill., assignor to Nudell Manufacturing Company, Inc., a corporation of Illinois Application August 21, 1933, Serial No. 686,105

11 Claims. (Cl. 100—49)

My invention relates to improvements in fruit juice extractors and similar devices.

My invention relates more particularly to devices of this type capable of operation upon individual objects of fruit, such as oranges, lemons, grapefruit, etc., whereby the cutting and tearing member may be inserted into a whole article of fruit through the skin, and, by applying external pressure, the fruit juice may be forced out through the mouth-piece or spout of the extractor.

The principal object of the present invention is to provide a device of the class described that is easily and cheaply constructed; yet one which will be very practical and efficient for the purpose for which it is designed.

A further object of the present invention is to provide new and improved structure, whereby the skin and the core of the fruit are cut and torn to provide a free passageway to the opening through the skin, so that juice can easily be forced to and out of the mouth-piece.

A further object is to provide improved cutting means for providing a free passageway to the spout or mouth-piece formed from a pair of similarly shaped parts secured together.

A further object is to provide an improved construction whereby the spout or mouth-piece portion and the cutter or knife portion are constructed separately and assembled together to form a neat and compact unit.

Other objects and advantages will be more apparent from the following description, wherein reference is had to the accompanying sheet of drawings, upon which Fig. 1 is a view in perspective of my improved device;

Figure 1:
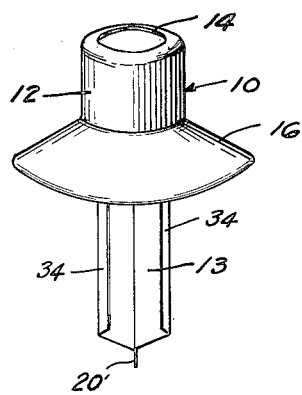

In the embodiment of the invention illustrated in the drawing, the extractor is composed of two parts, which are adapted to be securely fastened together to form an integral unit. These parts are the mouth-piece or spout member 10, and the knife member 13. The spout or mouth-piece 10 may be formed with a cylindrical body portion 12, with the walls thereof turned inwardly at the upper end to form the small opening 14. The lower end thereof may be outwardly flared, as shown, to form a shield portion 16, the edge 18 of which is curled under to form a slight roll edge.

The knife member 13 may be formed from a pair of similarly shaped portions of metal 20 and 22, with flat portions 24 and 26 facing each other, and with the side walls 28 and 30 extending in opposite directions. The two members 20 and 22 may be suitably fastened together by punching an opening into the wall 26 of member 20 and then protruding an eyelet portion formed in the part 22 therethrough, and pressing the same over. In this manner, a plurality of fastenings 32 may be provided, rigidly securing the two members together to form one integral unit.

The member 20 may have its lower end 20' extended below the lower end of the member 22, so that a flat, comparatively sharp, knife-like point is provided for the unit. Each of the walls 28 and 30 of the knife member is arranged to have a cutting edge 34 thereon, formed by bending the edge at approximately right angles thereto, so that, by rotating the knife member, cutting action will be produced.

It will be understood that the metal from which the knife member is formed is sufficiently thin so that no further operations are necessary upon any of the parts to produce a cutting edge thereon. The upper ends of the cutting edges 34 are extended into and lie adjacent the side wall of the cylindrical portion 12 of the mouth piece. The knife member is thus rigidly secured to the mouth piece by soldering or otherwise fastening the knife member to the spout member at this point.

From the foregoing description, it can be seen that, in the manner described, the two parts of the device are permanently secured together and an easy and simple method of constructing the same has been devised.

Figure 2:
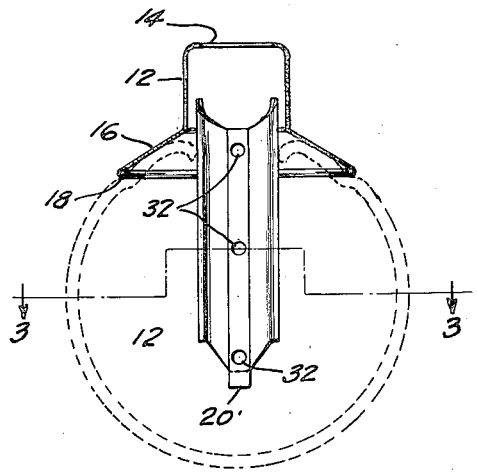
Fig. 2 is a vertical sectional view thereof at right angles to the position shown in Fig. 1, showing the manner in which the device is thrust into an article of fruit, such as an orange.
Figure 4:
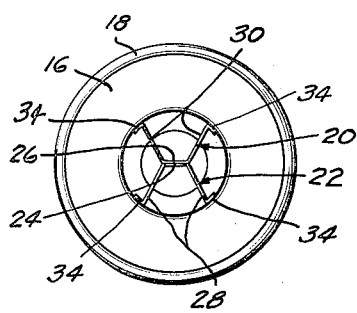
Fig. 4 is a bottom plan view of the device.
Figure 3:
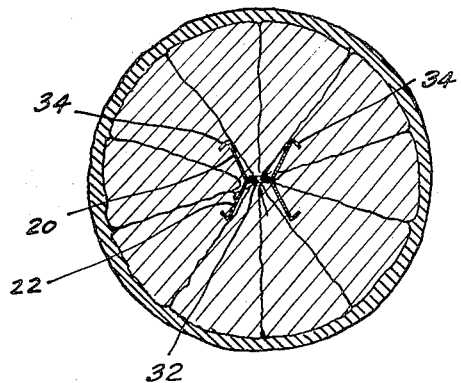
Fig. 3 is a horizontal sectional view, taken on the line 3—3 of Fig. 2.

The funnel-shaped portion 16 of the mouth-piece is provided for the purpose of forming a sealing edge against the outside of the skin of an article of fruit, such as an orange, when the device is inserted into an orange, as shown in Fig. 2. In this position, it will be obvious that, by inserting the knife member into the orange, rotating the same slightly, and then providing outside pressure upon the orange, the juice will be released therein, and the same will easily flow outwardly through the opening 14 of the mouth piece.

While I have illustrated and described a preferred form of the invention, it will be obvious that changes and modifications may be made in the details of the construction thereof, and I do not wish to limit myself in any particular; rather, what I desire to secure and protect by Letters Patent of the United States is:

1. A device of the class described comprising a body portion insertable into an article of fruit, said body portion being generally cross shaped and having a pointed lower end, the edges of said cross being bent at right angles to form cutting edges, a mouth-piece having a shield thereon, and the upper end of said body portion being secured to said mouth-piece.

2. A device of the class described comprising a body portion insertable into an article of fruit, said body portion being generally cross shaped and having a flat lower end, the edges of said cross being bent at right angles to form cutting edges, a mouth-piece having a shield thereon, and the upper end of said body portion being secured to said mouth-piece.

3. A fruit juice extractor comprising a tubular mouth-piece flared outwardly at one end to form a circular shield, and a cutting member in the form of a plurality of flattened knives having opposed cutting edges secured to the inner walls of said mouth-piece and extending outwardly therefrom beyond said shield.

4. A fruit juice extractor comprising a tubular mouth-piece flared outwardly at one end to form a circular shield, and a cutting member secured to the inner walls of said mouth-piece and extending outwardly therefrom beyond said shield, said cutting member in the form of a plurality of flattened knives, said knives having cutting edges at opposed angles.

5. A device of the class described comprising a cutting and tearing member for insertion into an object of fruit through an opening forced into the skin thereof, a spout secured to the outer end of said cutting member, a flange on said spout to abut the fruit in a circle around the opening therein, said cutting member including a plurality of flat blade members having offset edges.

6. A device of the class described comprising a cutting and tearing member for insertion into an object of fruit through an opening forced into the skin thereof, a spout secured to the outer end of said cutting member, a flange on said spout to abut the fruit in a circle around the opening therein, said cutting member including a pair of U-shaped members turned in opposite directions and fastened together.

7. A device of the class described comprising a cutting and tearing member for insertion into an object of fruit through an opening forced into the skin thereof, a spout secured to the outer end of said cutting member, a flange on said spout to abut the fruit in a circle around the opening therein, said cutting member including a pair of U-shaped members turned in opposite directions and fastened together, said cutter unit being secured to the inner wall of said spout at its upper end.

8. A device of the class described comprising a cutting member for insertion into an article of fruit through an opening forced through the skin thereof and a spout member therefor, said spout member being in the form of a cylinder having its upper end drawn in to provide an ensmalled opening and its lower end tapered outwardly and downwardly as a shield around said cutting member, said cutting member comprising a pair of U-shaped members turned in opposite directions and secured together.

9. A device of the class described comprising a cutting member for insertion into an article of fruit through an opening forced through the skin thereof and a spout member therefor, said spout member being in the form of a cylinder having its upper end drawn in to provide an ensmalled opening and its lower end tapered outwardly and downwardly as a shield around said cutting member, said cutting member formed from a pair of U-shaped members turned in opposite directions and secured together, and said cutting member having offset blade edges so that, by a half turn in opposite directions, the entire core of an article of fruit can be severed.

10. An article of the class described comprising a knife member for insertion into an orange, a spout member secured thereto having a flanged shield for support against the skin of the orange, said knife member formed from two similar parts secured together, said parts having edges bent at right angles thereto to form cutting edges.

11. An article of the class described comprising a knife member for insertion into an orange, a spout member secured thereto having a flanged shield for support against the skin of the orange, said knife member formed from two similar parts secured together, said parts having edges bent at right angles thereto to form cutting edges, and said knife member having a flat end.

ERIC J. STRAND.